United States Patent
Nishimoto et al.

(10) Patent No.: US 10,003,490 B2
(45) Date of Patent: Jun. 19, 2018

(54) COMMUNICATION SYSTEM, TRANSMISSION APPARATUS, RECEPTION APPARATUS, AND DIGITAL TRANSMISSION METHOD

(71) Applicant: Mitsubishi Electric Corporation, Tokyo (JP)

(72) Inventors: Hiroshi Nishimoto, Tokyo (JP); Akinori Ohashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 562 days.

(21) Appl. No.: 14/406,035

(22) PCT Filed: Jul. 29, 2013

(86) PCT No.: PCT/JP2013/070472
§ 371 (c)(1),
(2) Date: Dec. 5, 2014

(87) PCT Pub. No.: WO2014/030501
PCT Pub. Date: Feb. 27, 2014

(65) Prior Publication Data
US 2015/0156050 A1 Jun. 4, 2015

(30) Foreign Application Priority Data
Aug. 23, 2012 (JP) ................................. 2012-183814

(51) Int. Cl.
*H04L 27/34* (2006.01)
*H04L 27/18* (2006.01)

(52) U.S. Cl.
CPC ........ *H04L 27/3416* (2013.01); *H04L 27/183* (2013.01); *H04L 27/3488* (2013.01)

(58) Field of Classification Search
CPC ............... H04L 27/3416; H04L 27/183; H04L 27/3488
See application file for complete search history.

(56) References Cited

U.S. PATENT DOCUMENTS 8,472,549 B2   6/2013 Zhang et al.
8,668,703 B2   3/2014 Sullivan et al.
(Continued)

FOREIGN PATENT DOCUMENTS

EP   2 487 987 A1   8/2012
JP   2010 511427   4/2010
(Continued)

OTHER PUBLICATIONS

Extended European Search Report dated Feb. 24, 2016 in European Patent Application No. 13831017.2.
(Continued)

*Primary Examiner* — Hassan Kizou
*Assistant Examiner* — Abdullahi Ahmed
(74) *Attorney, Agent, or Firm* — Oblon, McClelland, Maier & Neustadt, L.L.P.

(57) ABSTRACT

A communication system using hierarchical modulation and capable of flexibly adjusting line quality includes a transmission apparatus that hierarchically modulates and transmits signal sequences, a reception apparatus that hierarchically demodulates a received signal, and a hierarchization-parameter setting unit that sets hierarchization parameters. The transmission apparatus includes a hierarchical modulation unit that superimposes signals from layers while maintaining gray codes. The reception apparatus includes a hierarchical demodulation unit that demodulates and separates hierarchically modulated signals and detects signals from layers. The hierarchization-parameter setting unit sets a hierarchization ratio which is a signal power ratio used for superimposing a higher layer and a lower layer, a mapping pattern capable of selecting two patterns, and a mapping pattern mixing ratio indicating a ratio with which two mapping patterns are mixed.

7 Claims, 12 Drawing Sheets

(56) References Cited

U.S. PATENT DOCUMENTS

| | | | |
|---|---|---|---|
| 2007/0054624 A1 | 3/2007 | Kashiwagi | |
| 2008/0133027 A1 | 6/2008 | Hodges | |
| 2009/0042511 A1* | 2/2009 | Malladi | H04L 5/023 |
| | | | 455/62 |
| 2010/0246711 A1* | 9/2010 | Kishigami | H04L 5/0039 |
| | | | 375/295 |
| 2010/0322129 A1 | 12/2010 | Niu et al. | |
| 2011/0096814 A1 | 4/2011 | Wu et al. | |
| 2011/0164545 A1* | 7/2011 | Koo | H04W 72/005 |
| | | | 370/312 |
| 2012/0057641 A1 | 3/2012 | Sadough et al. | |
| 2012/0189082 A1 | 7/2012 | Zhang et al. | |
| 2014/0128416 A1 | 5/2014 | Sullivan et al. | |
| 2015/0139120 A1* | 5/2015 | ElArabawy | H04L 5/0057 |
| | | | 370/329 |
| 2015/0326360 A1* | 11/2015 | Malladi | H04L 5/0032 |
| | | | 370/329 |

FOREIGN PATENT DOCUMENTS

| | | |
|---|---|---|
| JP | 2012 530456 | 11/2012 |
| WO | 2008 154506 | 12/2008 |
| WO | 2009 047915 | 4/2009 |
| WO | 2010 081760 | 7/2010 |

OTHER PUBLICATIONS

Kader, M. et al., "Development and Performance Evaluation of Hierarchical Quadrature Amplitude Modulation (HQAM) for Image Transmission over Wireless Channels", Third International Conference on Computational Intelligence, Modelling and Simulation, pp. 227-232, (2011).

Lim, J. et al., "Labeling and Decoding Schemes for Backward-Compatible Hierarchical Coded Modulation", IEEE Wireless Communications and Networking Conference, vol. 1, pp. 123-128, (2000).

Morimoto, M. et al., "A Hierarchical Image Transmission System in a Fading Channel", Proc. IEEE ICUPC'95., pp. 769-772, (Apr. 1995).

Hossain, J. et al., "Adaptive Hierarchical Modulation for Simultaneous Voice and Multiclass Data Transmission Over Fading Channels", IEEE Transactions on Vehicular Techonology, vol. 55, No. 4, pp. 1181-1194, (Jul. 2006).

International Search Report dated Aug. 20, 2013 in PCT/JP13/070472 Filed Jul. 29, 2013.

* cited by examiner

| MODULATION SYSTEM (M-QAM) | MODULATION SYSTEM PECULIAR PARAMETERS $\beta=2(M-1)/3$ |
|---|---|
| QPSK(4-QAM) | 2 |
| 16QAM | 10 |
| 64QAM | 42 |
| 256QAM | 170 |
| 1024QAM | 682 |

HIERARCHIZATION RATIOS $\rho i=1$, $\rho q=1$

HIERARCHIZATION RATIOS $\rho i=0.5$, $\rho q=0.5$

HIERARCHIZATION RATIOS $\rho i=0.05$, $\rho q=0.1$

FIG.7

| HIERARCHIZA-TION PATTERN | EQUIVALENT MODULATION SYMBOL | FIRST LAYER ALLOCATION BIT | SECOND LAYER ALLOCATION BIT | HIGHER BIT AMPLITUDE COEFFICIENT | LOWER BIT AMPLITUDE COEFFICIENT | SIGNAL POINT CALCULATION FORMULA (BIT MAPPING) |
|---|---|---|---|---|---|---|
| QPSK+QPSK | 16QAM | $\{b_{fI0},b_{fI1}\} = \{b_{I0},b_{I1}\}$ | $\{b_{sI0},b_{sI1}\} = \{b_{I1},b_{q1}\}$ | $A_{fI,I} = \sqrt{\frac{10-2p_I}{10-2}}$ | $A_{sI,I} = \frac{\sqrt{p_I}}{A_{fI,I}}$ | $S_I = \frac{A_{fI,I}}{\sqrt{10}} b_{I0}\{2 - A_{sI,I} \cdot b_{I1}\}$ |
| | | | | $A_{fI,q} = \sqrt{\frac{10-2q_I}{10-2}}$ | $A_{sI,q} = \frac{\sqrt{p_q}}{A_{fI,q}}$ | $S_q = \frac{A_{fI,q}}{\sqrt{10}} b_{q0}\{2 - A_{sI,q} \cdot b_{q1}\}$ |
| QPSK+16QAM | 64QAM | $\{b_{fI0},b_{fI1}\} = \{b_{I0},b_{q0}\}$ | $\{b_{sI0},b_{sI1},b_{sI2},b_{sI3}\} = \{b_{I1},b_{I2},b_{q1},b_{q2}\}$ | $A_{fI,I} = \sqrt{\frac{42-10p_I}{42-10}}$ | $A_{sI,I} = \frac{\sqrt{p_I}}{A_{fI,I}}$ | $S_I = \frac{A_{fI,I}}{\sqrt{42}} b_{I0}\{4 - A_{sI,I} \cdot b_{I1}(2 - b_{I2})\}$ |
| | | | | $A_{fI,q} = \sqrt{\frac{42-10p_q}{42-10}}$ | $A_{sI,q} = \frac{\sqrt{p_q}}{A_{fI,q}}$ | $S_q = \frac{A_{fI,q}}{\sqrt{42}} b_{q0}\{4 - A_{sI,q} \cdot b_{q1}(2 - b_{q2})\}$ |
| QPSK+64QAM | 256QAM | $\{b_{fI0},b_{fI1}\} = \{b_{I0},b_{q0}\}$ | $\{b_{sI0},b_{sI1},b_{sI2},b_{sI3},b_{sI4},b_{sI5}\} = \{b_{I1},b_{I2},b_{I3},b_{q1},b_{q2},b_{q3}\}$ | $A_{fI,I} = \sqrt{\frac{170-42p_I}{170-42}}$ | $A_{sI,I} = \frac{\sqrt{p_I}}{A_{fI,I}}$ | $S_I = \frac{A_{fI,I}}{\sqrt{170}} b_{I0}\{8 - A_{sI,I} \cdot b_{I1}(4 - b_{I2}(2 - b_{I3}))\}$ |
| | | | | $A_{fI,q} = \sqrt{\frac{170-42p_q}{170-42}}$ | $A_{sI,q} = \frac{\sqrt{p_q}}{A_{fI,q}}$ | $S_q = \frac{A_{fI,q}}{\sqrt{170}} b_{q0}\{8 - A_{sI,q} \cdot b_{q1}(4 - b_{q2}(2 - b_{q3}))\}$ |
| QPSK+256QAM | 1024QAM | $\{b_{fI0},b_{fI1}\} = \{b_{I0},b_{q0}\}$ | $\{b_{sI0},b_{sI1},b_{sI2},b_{sI3},b_{sI4},b_{sI5},b_{sI6},b_{sI7}\} = \{b_{I1},b_{I2},b_{I3},b_{I4},b_{q1},b_{q2},b_{q3},b_{q4}\}$ | $A_{fI,I} = \sqrt{\frac{682-170p_I}{682-170}}$ | $A_{sI,I} = \frac{\sqrt{p_I}}{A_{fI,I}}$ | $S_I = \frac{A_{fI,I}}{\sqrt{682}} b_{I0}\{16 - A_{sI,I} \cdot b_{I1}(8 - b_{I2}(4 - b_{I3}(2 - b_{I4})))\}$ |
| | | | | $A_{fI,q} = \sqrt{\frac{682-170p_q}{682-170}}$ | $A_{sI,q} = \frac{\sqrt{p_q}}{A_{fI,q}}$ | $S_q = \frac{A_{fI,q}}{\sqrt{682}} b_{q0}\{16 - A_{sI,q} \cdot b_{q1}(8 - b_{q2}(4 - b_{q3}(2 - b_{q4})))\}$ |
| 16QAM+16QAM | 256QAM | $\{b_{fI0},b_{fI1},b_{fI2},b_{fI3}\} = \{b_{I0},b_{I1},b_{q0},b_{q1}\}$ | $\{b_{sI0},b_{sI1},b_{sI2},b_{sI3}\} = \{b_{I2},b_{I3},b_{q2},b_{q3}\}$ | $A_{fI,I} = \sqrt{\frac{170-10p_I}{170-10}}$ | $A_{sI,I} = \frac{\sqrt{p_I}}{A_{fI,I}}$ | $S_I = \frac{A_{fI,I}}{\sqrt{170}} b_{I0}\{8 - b_{I1}(4 - A_{sI,I} \cdot b_{I2}(2 - b_{I3}))\}$ |
| | | | | $A_{fI,q} = \sqrt{\frac{170-10p_q}{170-10}}$ | $A_{sI,q} = \frac{\sqrt{p_q}}{A_{fI,q}}$ | $S_q = \frac{A_{fI,q}}{\sqrt{170}} b_{q0}\{8 - b_{q1}(4 - A_{sI,q} \cdot b_{q2}(2 - b_{q3}))\}$ |
| 16QAM+64QAM | 1024QAM | $\{b_{fI0},b_{fI1},b_{fI2},b_{fI3}\} = \{b_{I0},b_{I1},b_{q0},b_{q1}\}$ | $\{b_{sI0},b_{sI1},b_{sI2},b_{sI3},b_{sI4},b_{sI5}\} = \{b_{I2},b_{I3},b_{I4},b_{q2},b_{q3},b_{q4}\}$ | $A_{fI,I} = \sqrt{\frac{682-42p_I}{682-42}}$ | $A_{sI,I} = \frac{\sqrt{p_I}}{A_{fI,I}}$ | $S_I = \frac{A_{fI,I}}{\sqrt{682}} b_{I0}\{16 - b_{I1}(8 - A_{sI,I} \cdot b_{I2}(4 - b_{I3}(2 - b_{I4})))\}$ |
| | | | | $A_{fI,q} = \sqrt{\frac{682-42p_q}{682-42}}$ | $A_{sI,q} = \frac{\sqrt{p_q}}{A_{fI,q}}$ | $S_q = \frac{A_{fI,q}}{\sqrt{682}} b_{q0}\{16 - b_{q1}(8 - A_{sI,q} \cdot b_{q2}(4 - b_{q3}(2 - b_{q4})))\}$ |

FIG.8

|       |           | Q-ch        |             |             |
|-------|-----------|-------------|-------------|-------------|
|       |           | #0 ($b_{q0}$) | #1 ($b_{q1}$) | #2 ($b_{q2}$) |
| I-ch  | #0 ($b_{i0}$) | A | B | C |
|       | #1 ($b_{i1}$) | D | E | F |
|       | #2 ($b_{i2}$) | G | H | I |

FIG.9

| MAPPING PATTERN | FIRST LAYER ALLOCATION BIT $\{b_{fI0}, b_{fI1}\}$ | SECOND LAYER ALLOCATION BIT $\{b_{sI0}, b_{sI1}, b_{sI2}, b_{sI3}\}$ | ALLOCATION CHART IN EQUIVALENT MODULATION SYMBOL | | | |
|---|---|---|---|---|---|---|
| | | | | | I-ch | Q-ch |
| A | $\{b_{i0}, b_{q0}\}$ | $\{b_{i1}, b_{i2}, b_{q1}, b_{q2}\}$ | HIGH QUALITY ↕ LOW QUALITY | #0 | FIRST LAYER | FIRST LAYER |
| | | | | #1 | SECOND LAYER | SECOND LAYER |
| | | | | #2 | SECOND LAYER | SECOND LAYER |
| B | $\{b_{i0}, b_{q1}\}$ | $\{b_{i1}, b_{i2}, b_{q0}, b_{q2}\}$ | HIGH QUALITY ↕ LOW QUALITY | #0 | FIRST LAYER | SECOND LAYER |
| | | | | #1 | SECOND LAYER | FIRST LAYER |
| | | | | #2 | SECOND LAYER | SECOND LAYER |
| C | $\{b_{i0}, b_{q2}\}$ | $\{b_{i1}, b_{i2}, b_{q0}, b_{q1}\}$ | HIGH QUALITY ↕ LOW QUALITY | #0 | FIRST LAYER | SECOND LAYER |
| | | | | #1 | SECOND LAYER | SECOND LAYER |
| | | | | #2 | SECOND LAYER | FIRST LAYER |
| D | $\{b_{i1}, b_{q0}\}$ | $\{b_{i0}, b_{i2}, b_{q1}, b_{q2}\}$ | HIGH QUALITY ↕ LOW QUALITY | #0 | SECOND LAYER | FIRST LAYER |
| | | | | #1 | FIRST LAYER | SECOND LAYER |
| | | | | #2 | SECOND LAYER | SECOND LAYER |
| E | $\{b_{i1}, b_{q1}\}$ | $\{b_{i0}, b_{i2}, b_{q0}, b_{q2}\}$ | HIGH QUALITY ↕ LOW QUALITY | #0 | SECOND LAYER | SECOND LAYER |
| | | | | #1 | FIRST LAYER | FIRST LAYER |
| | | | | #2 | SECOND LAYER | SECOND LAYER |
| F | $\{b_{i1}, b_{q2}\}$ | $\{b_{i0}, b_{i2}, b_{q0}, b_{q1}\}$ | HIGH QUALITY ↕ LOW QUALITY | #0 | SECOND LAYER | SECOND LAYER |
| | | | | #1 | FIRST LAYER | SECOND LAYER |
| | | | | #2 | SECOND LAYER | FIRST LAYER |
| G | $\{b_{i2}, b_{q0}\}$ | $\{b_{i0}, b_{i1}, b_{q1}, b_{q2}\}$ | HIGH QUALITY ↕ LOW QUALITY | #0 | SECOND LAYER | FIRST LAYER |
| | | | | #1 | SECOND LAYER | SECOND LAYER |
| | | | | #2 | FIRST LAYER | SECOND LAYER |
| H | $\{b_{i2}, b_{q1}\}$ | $\{b_{i0}, b_{i1}, b_{q0}, b_{q2}\}$ | HIGH QUALITY ↕ LOW QUALITY | #0 | SECOND LAYER | SECOND LAYER |
| | | | | #1 | SECOND LAYER | FIRST LAYER |
| | | | | #2 | FIRST LAYER | SECOND LAYER |
| I | $\{b_{i2}, b_{q2}\}$ | $\{b_{i0}, b_{i1}, b_{q0}, b_{q1}\}$ | HIGH QUALITY ↕ LOW QUALITY | #0 | SECOND LAYER | SECOND LAYER |
| | | | | #1 | SECOND LAYER | SECOND LAYER |
| | | | | #2 | FIRST LAYER | FIRST LAYER |

FIG.12

| | | HIERARCHIZATION PARAMETERS | | |
|---|---|---|---|---|
| | | (1) HIERARCHIZATION RATIO | (2) MAPPING PATTERN | (3) MAPPING PATTERN MIXING RATIO |
| EXPLANATION | | SET, FOR EACH OF I/Q, SIGNAL POWER RATIO OF LOWER LAYER DURING HIERARCHIZATION | SELECT TWO PATTERNS FROM MAPPING PATTERN CANDIDATES (INCLUDING REDUNDANCY) | SET MIXING RATIO OF TWO MAPPING PATTERNS |
| ADJUSTMENT PARAMETERS | | I-ch:$p_i$ | PATTERN 1 | PATTERN 1: PATTERN 2 =M:N |
| | | Q-ch:$p_q$ | PATTERN 2 | |
| QUALITY ADJUSTMENT EFFECT | HIGHER LAYER | QUALITY IMPROVEMENT | QUALITY DETERIORATION (DISCRETE) | QUALITY DETERIORATION (ARBITRARILY ADJUSTABLE) |
| | LOWER LAYER | QUALITY DETERIORATION | QUALITY IMPROVEMENT (DISCRETE) | QUALITY IMPROVEMENT (ARBITRARILY ADJUSTABLE) |

FIG.13

(1) ADJUSTMENT RANGE BY HIERARCHIZATION RATIO
(2) ADJUSTMENT RANGE (DISCRETE) BY MAPPING PATTERN
(3) ADJUSTMENT RANGE (ARBITRARILY ADJUSTABLE) BY MAPPING PATTERN MIXING RATIO

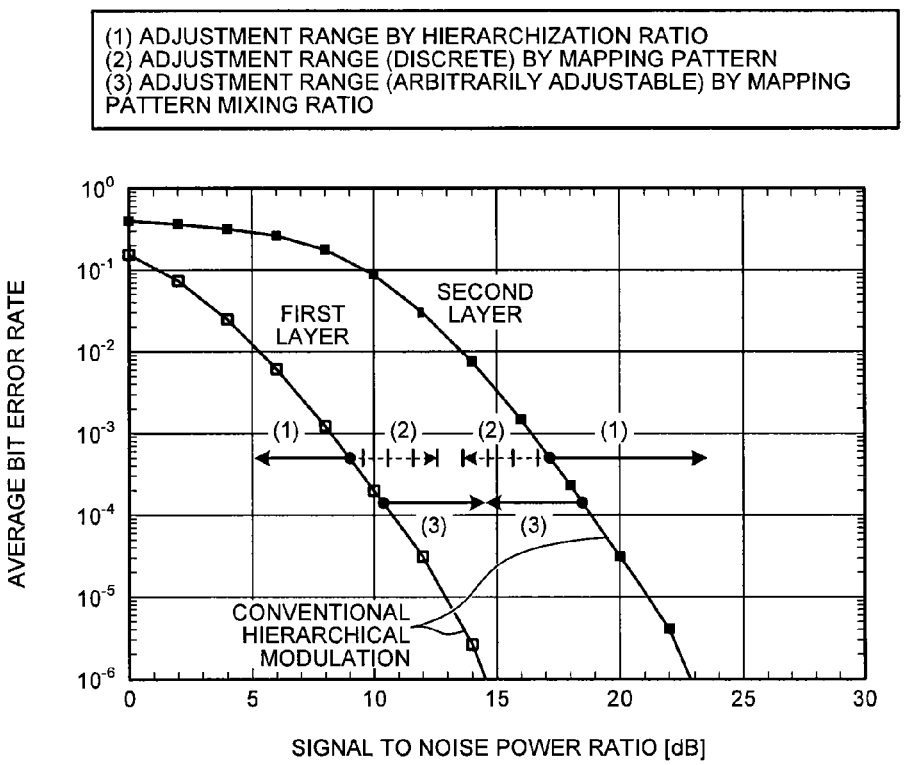

COMMUNICATION SYSTEM, TRANSMISSION APPARATUS, RECEPTION APPARATUS, AND DIGITAL TRANSMISSION METHOD

FIELD

The present invention relates to a communication system that uses hierarchical modulation in which a plurality of lines are superimposed by using a multi-value modulation signal.

BACKGROUND

Hierarchical modulation for hierarchically superimposing individually mapped signals is one of the known methods for simultaneously transmitting a plurality of data streams having different data priority levels and transmission speeds (Non Patent Literature 1 described below). Layers in the hierarchical modulation are usable as independent lines. Note that, among the layers of the hierarchical modulation dealt with here, a first layer has the highest line quality (the lowest bit error rate) and lower layers have lower line qualities (higher bit error rates).

In general, when two streams are multiplexed by using hierarchical modulation, each of the layers is separated into either a high-reliability line (a first layer) for QPSK (Quadrature Phase Shift Keying) or the like and a low-reliability line (a second layer) for QAM (Quadrature Amplitude Modulation), or the like, that is superimposed on the first layer. In such a case, there is a problem in that the line qualities of the layers in conventional hierarchical modulation are fixed and the amount of freedom allowed when designing a circuit is low when hierarchical modulation is used.

A measure against the problem is disclosed in Non Patent Literature 2, listed below. The measure disclosed is a technique for changing sizes (constellation sizes) of signal points of layers during superimposition in order to adjust line quality.

CITATION LIST

Non Patent Literature

Non Patent Literature 1: M. Morimoto, M. Okada, and S. Komaki, "A Hierarchical Image Transmission System in a Fading Channel," Proc. IEEE ICUPC '95, pp. 769-772, April 1995.

Non Patent Literature 2: Md. J. Hossain, P. K. Vitthaladevuni, M.-S. Alouini, V. K. Bhargava, and A. J. Goldsmith, "Adaptive Hierarchical Modulation for Simultaneous Voice and Multiclass Data Transmission Over Fading Channels, "IEEE Trans. Veh. Technol., vol. 55, no. 4, pp. 1181-1194, July 2006.

SUMMARY

Technical Problem

However, according to the conventional technology (Non Patent Literature 2), the quality of the first layer line is further improved at the cost of deterioration in the quality of the second layer line due to the change in the constellation sizes during the superimposition. Therefore, there is a problem in that it is difficult to improve the quality of the second layer line.

According to the conventional technology (Non Patent Literature 2), in the hierarchization method, independently bit-mapped layers are simply superimposed on one another. Therefore, there is a problem in that it is difficult to keep the relation of gray codes between adjacent signal points after the hierarchization, that is, the relation in which only one bit is different between the adjacent signal points.

The present invention has been made in view of the above and it is an objective of the present invention to obtain a communication system capable of flexibly adjusting each of the line qualities when hierarchical modulation is used.

Solution to Problem

To solve the problems and achieve the objective described above, the present invention relates to a communication system that superimposes a plurality of signal sequences by using hierarchical modulation and simultaneously transmits the signal sequences. The communication system includes: a transmission apparatus that hierarchically modulates and transmits a plurality of signal sequences; a reception apparatus that hierarchically demodulates a received signal; and a hierarchization-parameter setting unit that sets hierarchization parameters necessary for the hierarchical modulation in the transmission apparatus and the hierarchical demodulation in the reception apparatus. The transmission apparatus includes a hierarchical modulation unit that superimposes, on the basis of the hierarchization parameters, signals of a plurality of layers by using the hierarchical modulation while maintaining gray codes. The reception apparatus includes a hierarchical demodulation unit that demodulates and separates the hierarchically modulated signals by using the hierarchical demodulation and detects the signals of the layers on the basis of the hierarchization parameters, and the hierarchization-parameter setting unit sets, as the hierarchization parameters, a hierarchization ratio, which is a signal power ratio for superimposing a higher layer and a lower layer, a mapping pattern capable of selecting two patterns from pattern candidates for bit mapping while allowing redundancy, and a mapping pattern mixing ratio indicating a ratio for mixing two mapping patterns in the signal sequences.

Advantageous Effects of Invention

The communication system according to the present invention has an effect whereby it is possible to flexibly adjust each of the line qualities when hierarchical modulation is used.

BRIEF DESCRIPTION OF DRAWINGS

FIG. 7 is a diagram illustrating an example of a signal point calculation formula of hierarchical modulation in which hierarchization ratios are introduced.

FIG. 8 is a diagram illustrating a mapping pattern example of a first layer of QPSK+16QAM.

FIG. 9 is a diagram illustrating details of mapping patterns of a first layer and a second layer of QPSK+16QAM.

FIG. 12 is a diagram illustrating an overview of hierarchization parameters.

FIG. 13 is a diagram illustrating effects of the hierarchization parameters.

DESCRIPTION OF EMBODIMENTS

Embodiments of a communication system according to the present invention are described in detail below with reference to the drawings. Note that the present invention is not limited to the embodiments.

First Embodiment

Figure 1:
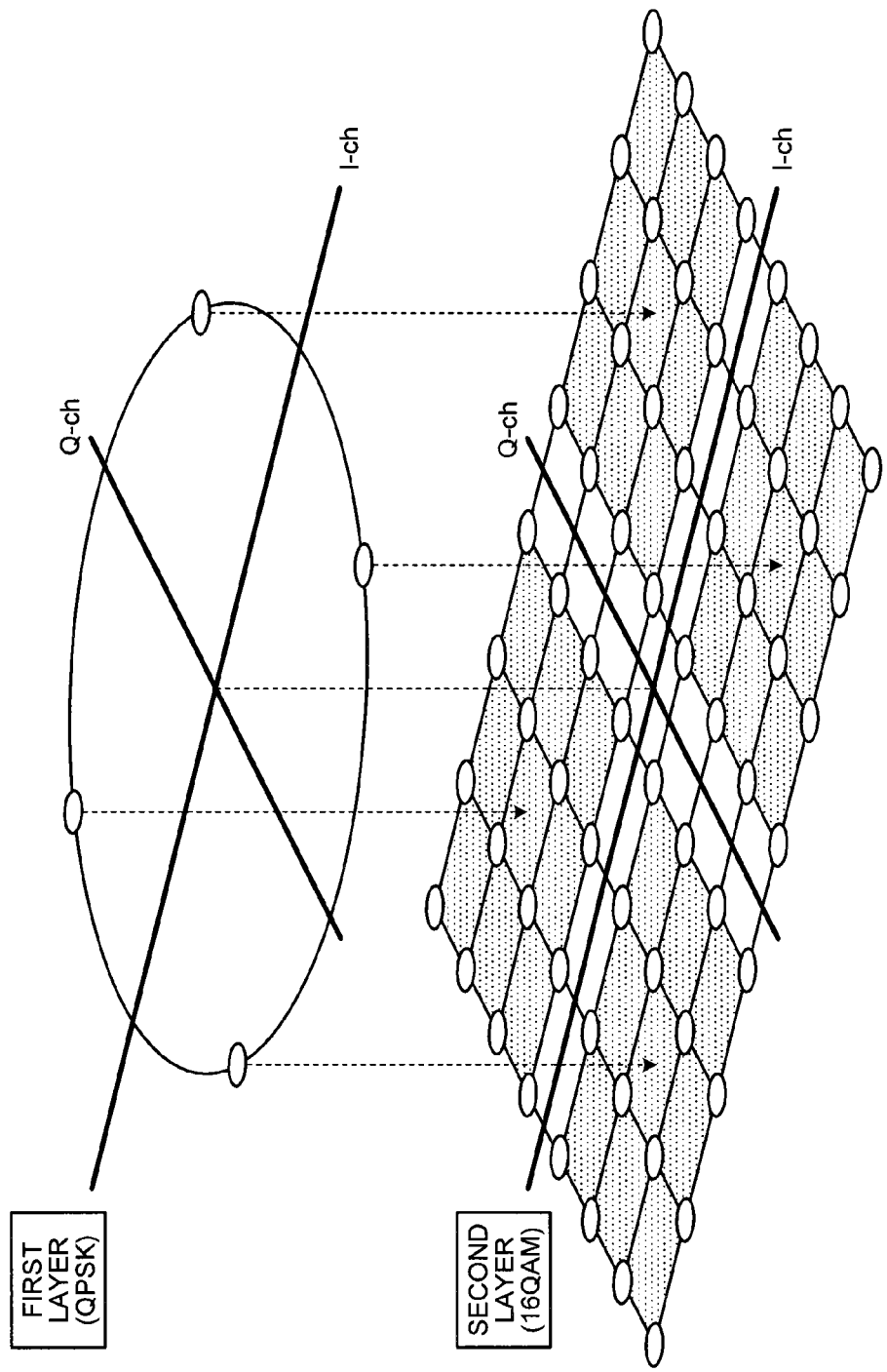
FIG. 1 is a diagram illustrating the concept of hierarchical modulation.

Conventional hierarchical modulation is briefly described here. FIG. 1 is a diagram illustrating the concept of hierarchical modulation. Layers in the hierarchical modulation are usable as independent lines. Layers in multiplexing two streams by using the hierarchical modulation are divided into a high-reliability line (a first layer) for QPSK or the like and a low-reliability line (a second layer) for QAM, or the like (e.g., 16QAM), superimposed on the first layer.

Three parameters, i.e., a hierarchization ratio, a mapping pattern, and a mapping pattern mixing ratio, which are hierarchization parameters used in the hierarchical modulation in the embodiments, are described. For simplification, an example is described where two lines are superimposed by using hierarchical modulation. As an example, QPSK (2 bits) is allocated to the first layer and 16QAM (4 bits) is allocated to the second layer. In the following description, this hierarchization parameter is referred to as QPAK+16QAM. In this case, an equivalent modulation symbol after hierarchization is equivalent to 64QAM. Note that a combination of superimposition is an example and is not limited to this combination.

First, the hierarchization ratio is described as a first parameter. A hierarchization ratio $\rho$ is a parameter indicating a signal power ratio during superimposition of the second layer on the first layer and is a value in a range of $0<\rho\leq1$. When $\rho=1$, a hierarchical modulation symbol is the same constellation as a normal M-QAM modulation symbol (M is an integer of a power of 2 equal to or larger than 4). As p is closer to 0, the hierarchical modulation symbol is closer to the constellation of only a modulation symbol of the first layer.

In Non Patent Literature 2 described above, a parameter synonymous with the hierarchization ratio is defined and the line quality of the first layer after hierarchization is adjusted. However, in order to maintain the relation between gray codes during conventional hierarchical modulation, it is necessary to superimpose the layers after performing, on a transmission side, processing for, for example, rotating a phase of a signal point of the second layer according to a signal point of the first layer, interchanging an in-phase (I-ch) and an anti-phase (Q-ch), and calculating a complex conjugate. Further, in this case, on the reception side, it is necessary to demodulate each of the lines according to a given rule.

Therefore, in the embodiment, new bit mapping in which hierarchization ratios are introduced is carried out while the relation between gray codes is maintained. The hierarchization ratios can be independently set for the I-ch/Q-ch. Therefore, the hierarchization ratio for the I-ch is represented as $\rho_i$ and the hierarchization ratio for the Q-ch is represented as $\rho_q$. Bits are represented by b. It is assumed that the bits take a value of $b=\pm1$. Because the equivalent modulation symbol after the hierarchization is equivalent to 64QAM, each of the I-ch/Q-ch is 3 bits. The 3 bits of the I-ch are represented as $b_{i0}$, $b_{i1}$, and $b_{i2}$. The 3 bits of the Q-ch are represented as $b_{q0}$, $b_{q1}$, and $b_{q2}$. In this case, as mapping bit quality, concerning the I-ch, $b_{i0}$ has the highest quality and $b_{i2}$ has the lowest quality. Concerning the Q-ch, $b_{q0}$ has the highest quality and $b_{q2}$ has the lowest quality. Two bits of the first layer are represented as $b_{fl0}$ and $b_{fl1}$ and 4 bits of the second layer are represented as $b_{sl0}$, $b_{sl1}$, $b_{sl2}$, and $b_{sl3}$. The quality of the first layer is prioritized so as to allocate $\{b_{fl0}, b_{fl1}\}=\{b_{i0}, b_{q0}\}$ to the first layer and allocate $\{b_{sl0}, b_{sl1}, b_{sl2}, b_{sl3}\}=\{b_{i1}, b_{i2}, b_{q1}, b_{q2}\}$ to the second layer. When bit amplitude coefficients of the I-ch/Q-ch of the first layer (a higher layer) are respectively represented as $A_{fl,i}$ and $A_{fl,q}$ and bit amplitude coefficients of the I-ch/Q-ch of the second layer (a lower layer) are respectively represented as $A_{sl,i}$ and $A_{sl,q}$, an I-ch signal $s_i$ and a Q-ch signal $s_q$ after the hierarchical modulation can be respectively represented by the following Formulas (1) and (2). Note that, in the formulas, $\sqrt{(X)}$ represents a square root.

$$s_i=(A_{fl,i}/\sqrt{(\beta_{hm})})\times b_{i0}(4-A_{sl,i}\times b_{i1}(2-b_{i2})) \quad (1)$$

$$s_q=(A_{fl,q}/\sqrt{(\beta_{hm})})\times b_{q0}(4-A_{sl,q}\times b_{q1}(2-b_{q2})) \quad (2)$$

Figures 2, 3:
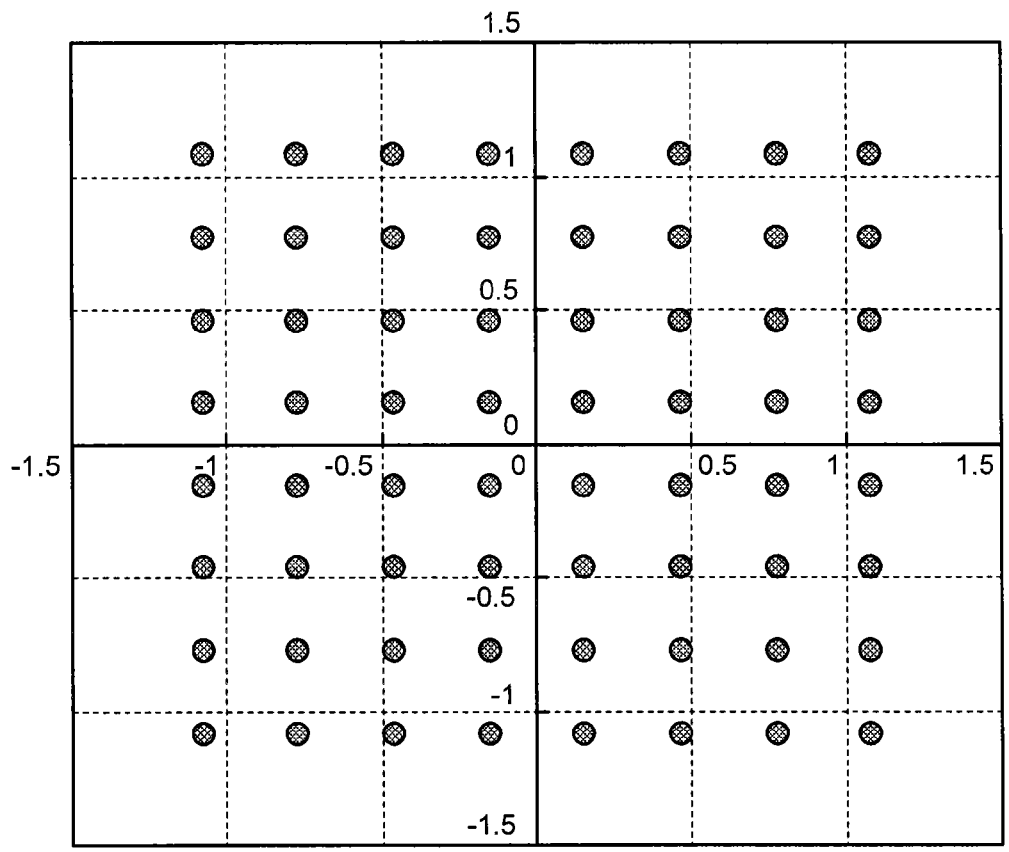
FIG. 2 is a diagram illustrating parameters peculiar to a modulation system.
FIG. 3 is a diagram illustrating a constellation example of hierarchical modulation in which hierarchization ratios are introduced.

In the formulas, $\beta_{hm}$ represents a modulation system parameter peculiar to the equivalent modulation symbol after the hierarchization. Parameters of modulation systems are as illustrated in FIG. 2 (in M-QAM modulation, $\beta=2(M-1)/3$). FIG. 2 is a diagram illustrating parameters peculiar to a modulation system. For example, when the equivalent modulation symbol (a modulation system) is 64QAM, $\beta_{hm}=42$. $(1/\sqrt{(\beta_{hm})})$ is multiplied so as to normalize the average signal power after the hierarchical modulation to have a value of 1. $A_{fl,i}$, $A_{fl,q}$, $A_{sl,i}$, and $A_{sl,q}$ are respectively set by hierarchization ratios as indicated by Formulas (3) to (6) below:

$$A_{fl,i}=\sqrt{((\beta_{hm}-\beta_{sl}\rho_i)/(\beta_{hm}-\beta_{sl}))}=\sqrt{((42-10\rho_i)/(42-10))} \quad (3)$$

$$A_{fl,q}=\sqrt{((\beta_{hm}-\beta_{sl}\rho_q)/(\beta_{hm}-\beta_{sl}))}=\sqrt{((42-10\rho_q)/(42-10))} \quad (4)$$

$$A_{sl,i}=\sqrt{(\rho_i)}/A_{fl,I} \quad (5)$$

$$A_{sl,q}=\sqrt{(\rho_q)}/A_{fl,q} \quad (6)$$

In the formulas, $\beta_{sl}$ represents a modulation symbol peculiar parameter to the second layer. Because the second layer is 16QAM, referring to FIG. 2, $\beta_{sl}$=10. In Formulas (3) to (6), when $\rho_i$=1 and $\rho_q$=1, then $A_{fl,i}=A_{fl,q}=A_{sl,i}=A_{sl,q}$=1. In this case, Formulas (1) and (2) give the same bit mapping as gray-encoded normal 64QAM. Note that, the bit mapping is capable of maintaining the gray codes even when codes are inverted from the definition of Formulas (1) and (2). Therefore, it can be easily imagine that the bit mapping is included in a range indicated in the embodiment. I-ch/Q-ch signal calculation formulas in that case are described as Formulas (7) and (8):

$$s_i = -(A_{fl,i}/\sqrt{\beta_{hm}}) \times b_{i0}(4 - A_{sl,i} \times b_{i1}(2 - b_{i2})) \quad (7)$$

$$s_q = -(A_{fl,q}/\sqrt{\beta_{hm}}) \times b_{q0}(4 - A_{sl,q} \times b_{q1}(2 - b_{q2})) \quad (7)$$

Figure 4:
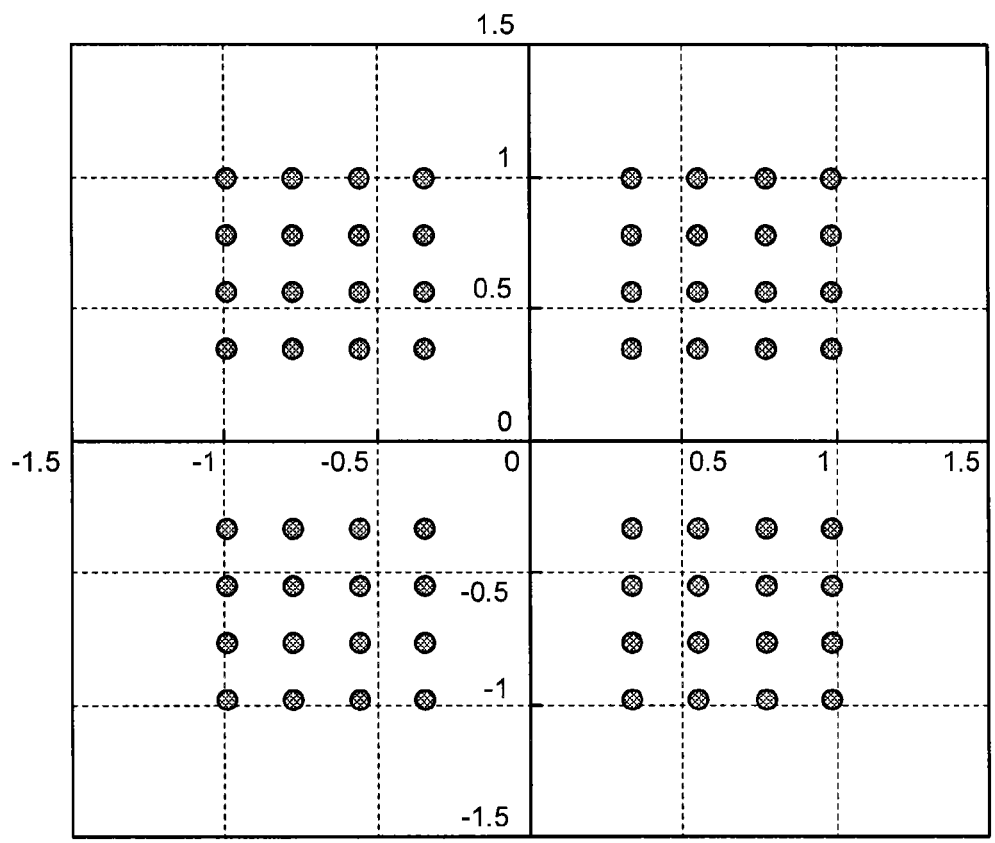
FIG. 4 is a diagram illustrating a constellation example of hierarchical modulation in which hierarchization ratios are introduced.
Figure 5:
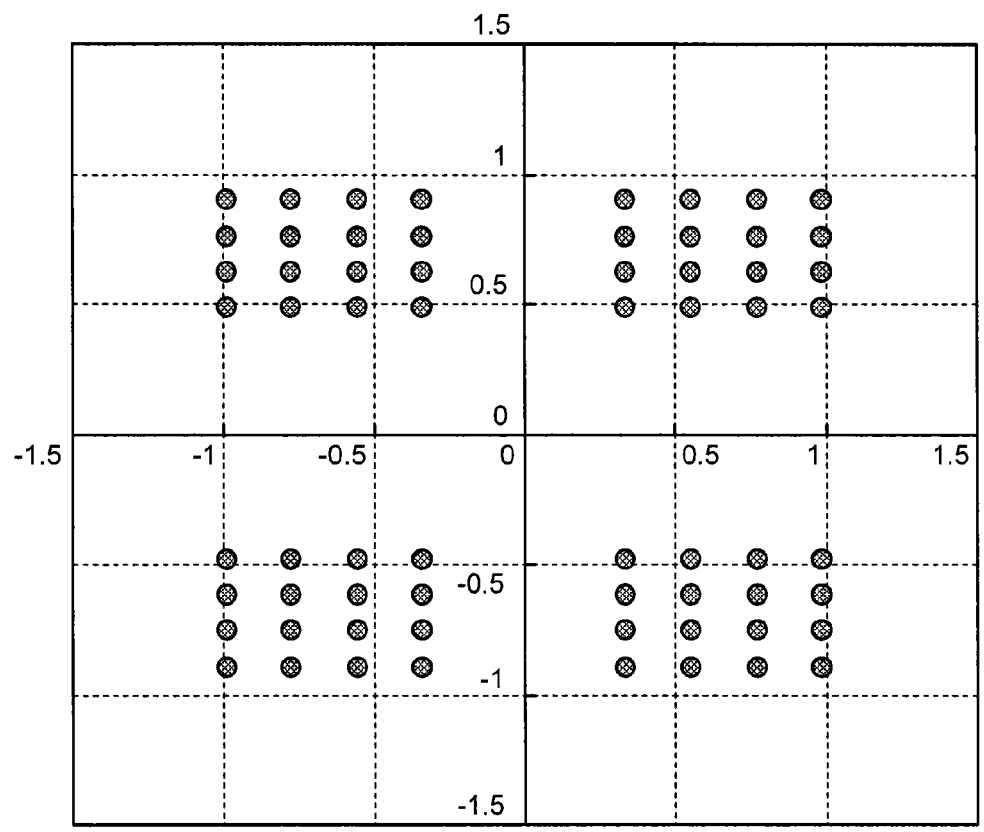
FIG. 5 is a diagram illustrating a constellation example of hierarchical modulation in which hierarchization ratios are introduced.
Figure 6:
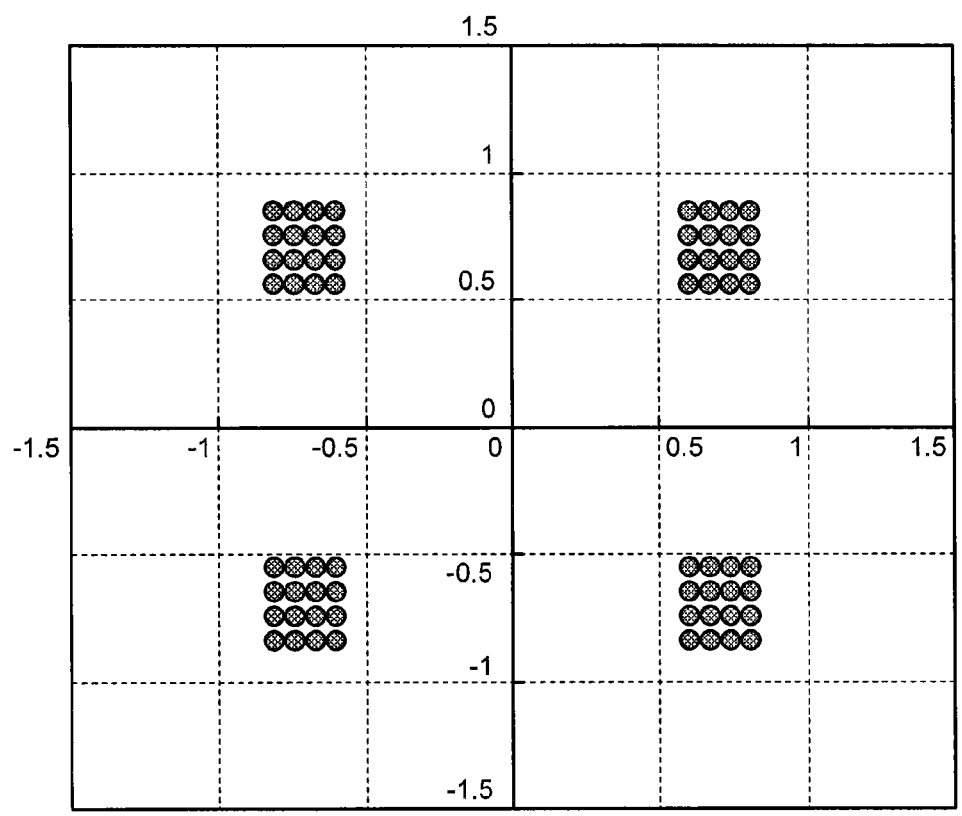
FIG. 6 is a diagram illustrating a constellation example of the hierarchical modulation in which hierarchization ratios are introduced.

FIGS. 3 to 6 are diagrams illustrating constellation examples of the hierarchical modulation in which the hierarchization ratios are introduced. FIG. 3 illustrates a constellation of hierarchical modulation symbols in the case of $\rho_i$=1 and $\rho_q$=1 in the hierarchical modulation of QPSK+16QAM. As a reference, a constellation of hierarchical modulation symbols in the case of $\rho_i$=0.5 and $\rho_q$=0.5 is illustrated in FIG. 4. A constellation of hierarchical modulation symbols in the case of $\rho_i$=0.5 and $\rho_q$=0.2 is illustrated in FIG. 5. A constellation of hierarchical modulation symbols in the case of $\rho_1$=0.05 and $\rho_q$=0.1 is illustrated in FIG. 6. By comparing FIGS. 3 to 6, it is understood that, as the hierarchization ratio is set smaller, the constellation is closer to the constellation of the QPSK of the first layer.

A bit mapping method in the embodiment is also applicable to different hierarchization patterns. As examples other than QPSK+16QAM, for example, there are QPSK+QPSK, QPSK+64QAM, QPSK+256QAM, 16QAM+16QAM, and 16QAM+64QAM. A bit mapping method, in which hierarchization ratios in these cases are introduced, is illustrated in FIG. 7. FIG. 7 is a diagram illustrating an example of a signal point calculation formula of the hierarchical modulation in which the hierarchization ratios are introduced. Concerning the hierarchization patterns described above, an equivalent modulation symbol, a first layer allocation bit, a second layer allocation bit, a higher bit amplitude coefficient, a lower bit amplitude coefficient, and a signal point calculation formula (bit mapping) are described.

Although not illustrated, because the I-ch/Q-ch is independent, the bit mapping method is also applicable to hierarchization performed when the number of bits of the I-ch/Q-ch are asymmetric.

The bit mapping method can realize the hierarchical modulation reflecting the hierarchization ratios while maintaining the gray codes. However, the line quality, which can be adjusted by the hierarchization ratios, can only be adjusted in a direction in which the quality of the first layer is improved and the quality of the second layer is deteriorated at the cost of the improvement of the quality of the first layer. Therefore, the quality of the second layer cannot be improved.

Therefore, in the embodiment, in order to solve the problem, mapping patterns, which are second parameters, are introduced as hierarchization parameters. The mapping patterns are described below.

In the hierarchical modulation of QPSK+16QAM, the first layer is 2-bit mapped in one modulation symbol. Because the equivalent modulation symbol after the hierarchization is equivalent to 64QAM, 3 bits are allocated to each of the I-ch/Q-ch. If 1 bit of 2 bits of the first layer is allocated to each of the I-ch/Q-ch, nine mapping patterns in total of patterns A to I are present as illustrated in FIG. 8. FIG. 8 is a diagram illustrating a mapping pattern example of the first layer in QPSK+16QAM. The conventional hierarchical modulation corresponds to the pattern A.

When a mapping pattern of the first layer is determined, a mapping pattern of the second layer is also uniquely determined. Therefore, the mapping patterns are in a one-to-one relation. FIG. 9 is a diagram illustrating details of mapping patterns of the first layer and the second layer in QPSK+16QAM. Bit mappings of the first layer and the second layer in the patterns A to I illustrated in FIG. 8 are collected as a list. For example, the pattern B is a pattern in which allocation of 1 bit of 2 bits of the first layer in the pattern A is changed from $b_{q0}$ to $b_{q1}$. Therefore, the quality of the first layer line of the pattern B deteriorates compared with the pattern A. However, because the quality of 1 bit of 4 bits of the second layer line is improved, the line quality of the second layer is improved. In this way, the qualities of the first layer line and the second layer line of the patterns A to I are different from each other. The second layer line of the pattern A, which is the conventional hierarchical modulation, is the worst. The other patterns are patterns in which the line quality of the second layer is improved from the line quality in the past. Therefore, by introducing the mapping patterns, it is possible to improve the quality of the second layer line that cannot be realized by the hierarchization ratio.

Figures 10, 11:
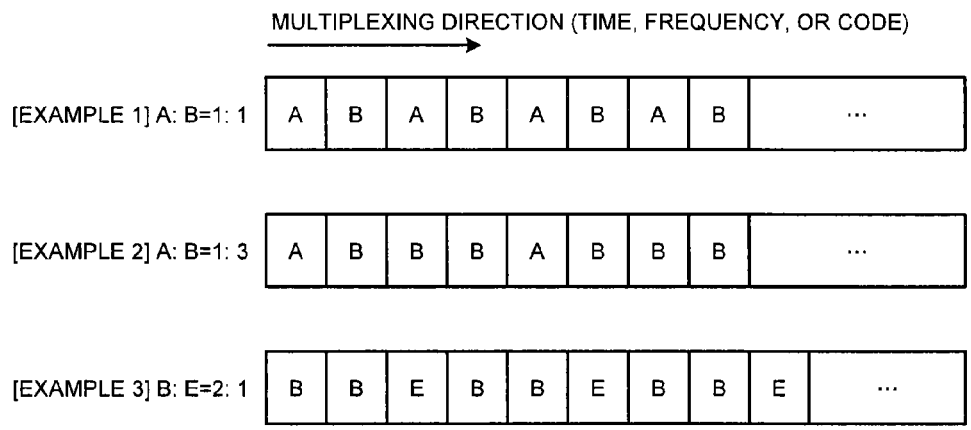
FIG. 10 is a diagram illustrating an example of mapping pattern candidates from the first layer of QPSK+16QAM.
FIG. 11 is a diagram illustrating an example of mapping pattern mixing ratios.

As is understood from an allocation diagram in the equivalent modulation symbol illustrated in FIG. 9, for example, the pattern I is a pattern in which 2 bits of the first layer are allocated in the worst quality. In this case, the line quality of the second layer is better than the line quality of the first layer. Such a pattern is against the premise that quality is higher in a higher layer. Therefore, the pattern is present as a mapping pattern but is not to be included in mapping pattern candidates. As a result of investigating characteristics in advance, it is understood that the patterns F, H, and I are to be excluded from the mapping pattern candidates in the example of QPSK+16QAM. FIG. 10 is a diagram illustrating an example of mapping pattern candidates from the first layer in QPSK+16QAM. Effective mapping pattern candidates for the first layer are described. A mapping pattern is selected from the pattern candidates illustrated in FIG. 10 and set as one of the hierarchization parameters in the embodiment.

Note that, although not described, a plurality of mapping patterns are present in hierarchizations other than the hierarchization of QPSK+16QAM. Therefore, it is possible to apply the mapping patterns to any arbitrary hierarchical modulation.

As described above, it is understood that the line quality of the second layer can be improved at the cost of the line quality of the first layer by selecting an appropriate mapping pattern during the hierarchical modulation. However, for example, in QPSK+16QAM, effective mapping patterns illustrated in FIG. 10 include only six patterns. Because the quality difference among the patterns is discrete, it is difficult to perform flexible quality adjustment.

Therefore, in the embodiment, to solve the problem mentioned above, a mapping pattern mixing ratio, which is a third parameter, is introduced as a hierarchization parameter. The mapping pattern mixing ratio is described below.

In digital communication, in general, multiplex transmission is performed by using a plurality of hierarchical modulation symbols according to time multiplex, frequency multiplex, code multiplex, or the like. In that case, by mixing hierarchical modulation symbols of a plurality of mapping patterns, it is possible to realize the intermediate quality of the mapping patterns to be mixed. By adjusting the mapping patterns to be mixed and composition ratios of the mapping patterns, it becomes possible to perform flexible quality adjustment, which is difficult by only selecting mapping patterns.

FIG. 11 is a diagram illustrating an example of mapping pattern mixing ratios. Examples in which the mapping pattern mixing ratios are introduced are described here. In FIG. 11, an example 1 is an example in which hierarchical modulation symbols of the pattern A and the pattern B are mixed at a ratio of 1:1. In this case, in both of the first layer and the second layer, an obtained overall characteristic is an intermediate quality of the pattern A and the pattern B. Similarly, an example 2 is an example in which the pattern A and the pattern B are mixed at a ratio of 1:3. Quality closer to the line quality of the pattern B than the example 1 is obtained. An example 3 is an example in which the pattern B and the pattern E are mixed at a ratio of 2:1. Although not illustrated in the figure, it is also conceivable to mix three or more patterns. In realizing the intermediate quality between patterns, only two specific patterns have to be mixed. Note that it goes without saying that, when the same pattern is selected as the two patterns, the quality of the corresponding pattern is obtained irrespective of the mixing ratio.

The three hierarchization parameters in the embodiment are described above. A table indicating the summary is illustrated in FIG. 12. FIG. 12 is a diagram illustrating an overview of the hierarchization parameters.

As the hierarchization ratio, which is the first parameter, a signal power ratio for a lower layer during hierarchization can be set in each of the I-ch/Q-ch. As the hierarchization ratio, a hierarchization ratio for the I-ch is represented as $\rho_i$ and a hierarchization ratio for the Q-ch is represented as $\rho_q$. The hierarchization ratio is a parameter for improving the quality of a higher layer and deteriorating the quality of a lower layer.

As the mapping pattern, which is the second parameter, two patterns are selected from mapping pattern candidates (including redundancy). The mapping pattern discretely deteriorates the quality of the higher layer and discretely improves the quality of the lower layer.

As the mapping pattern mixing ratio, which is the third parameter, a mixing ratio for the selected mapping patterns is set. The selected mapping patterns are set at any ratio. The mapping pattern mixing ratio can be arbitrarily adjusted when the quality of the higher layer deteriorates and can be arbitrarily adjusted when the quality of the lower layer is improved.

FIG. 13 is a diagram illustrating the effects of the hierarchization parameters. An image of a quality adjustment range of three hierarchization parameters is illustrated by using an average bit error rate characteristic as an example. As described with reference to FIG. 12, due to the hierarchization parameters, it is possible to perform flexible quality adjustment on each of the lines that could not be realized in the past.

Note that, in the description of the hierarchization parameters, the hierarchization parameters are described by using the hierarchical modulation for superimposing two layers as an example. However, the hierarchization parameters are not limited to this. The hierarchization parameters are also applicable to hierarchical modulation for superimposing three or more layers. In this case, the hierarchization parameters are applicable irrespective of the number of layers by repeating a procedure for setting the hierarchization parameters being divided into the first layer and the other lower layers and then setting hierarchization parameters being divided into a highest layer among the remaining lower layers and the other lower layers.

In the description of the hierarchization parameters, the hierarchization parameters are described by using the hierarchization of QPSK+16QAM as an example. However, the hierarchization parameters are not limited to this. Those skilled in the art easily understand that the hierarchization parameters can be specified irrespective of modulation levels as long as the hierarchization is hierarchization of PSK (Phase Shift Keying) modulation and QAM modulation.

As specific configurations, a communication system, a transmission apparatus, and a reception apparatus according to the embodiment are described with reference to the figures.

Figure 14:
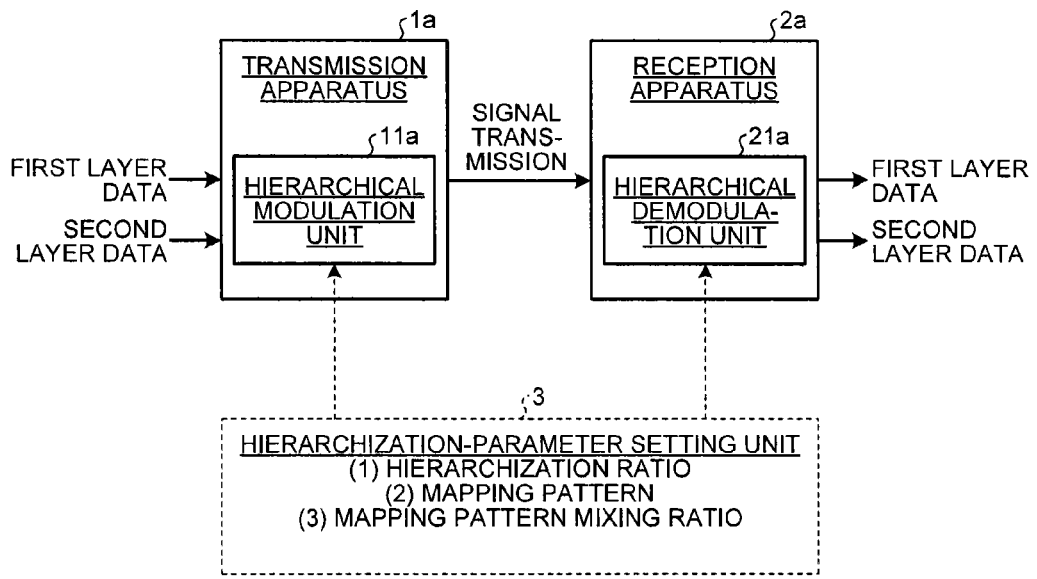
FIG. 14 is a diagram illustrating a configuration example of a communication system according to a first embodiment.

FIG. 14 is a diagram illustrating a configuration example of the communication system according to the embodiment. The communication system is configured from a transmission apparatus 1a, a reception apparatus 2a, and a hierarchization-parameter setting unit 3. The transmission apparatus 1a includes a hierarchical modulation unit 11a that receives the setting of hierarchization parameters from outside and performs hierarchical modulation. The reception apparatus 2a includes a hierarchical demodulation unit 21a that receives the hierarchization parameters from outside and performs hierarchical demodulation.

As an example of the communication system, for simplification of explanation, a system that performs one-to-one digital transmission from the transmission apparatus 1a to the reception apparatus 2a is illustrated. It is assumed that, as an example, there are two kinds of transmission target data; and the two kinds of transmission target data are respectively transmitted by a first layer line and a second layer line of the hierarchical modulation. Application of various systems is conceivable as a communication system excluding the hierarchical modulation. For example, there are single carrier transmission, OFDM (Orthogonal Frequency Division Multiplexing) transmission, and code multiplex transmission. However, any transmission system can be applied. Therefore, a detailed communication system excluding the hierarchical modulation is not limited.

The hierarchization-parameter setting unit 3 sets hierarchization parameters determined by, for example, an operation from a user to the hierarchical modulation unit 11a of the transmission apparatus 1a and the hierarchical demodulation unit 21a of the reception apparatus 2a.

In the transmission apparatus 1a, the hierarchical modulation unit 11a superimposes two kinds of data by using the hierarchical modulation and generates and transmits a hierarchical modulation symbol. The hierarchical modulation unit 11a receives the setting from the hierarchization-parameter setting unit 3, which can set hierarchization parameters, and performs the hierarchical modulation.

In the reception apparatus 2a, the hierarchical demodulation unit 21a demodulates and separates the data superimposed in two layers from the received hierarchical modulation symbol by using the hierarchical demodulation and detects the two kinds of data. The hierarchical demodulation unit 21a receives the setting from the hierarchization-parameter setting unit 3, which can set hierarchization parameters, and performs hierarchical demodulation.

Figure 15:
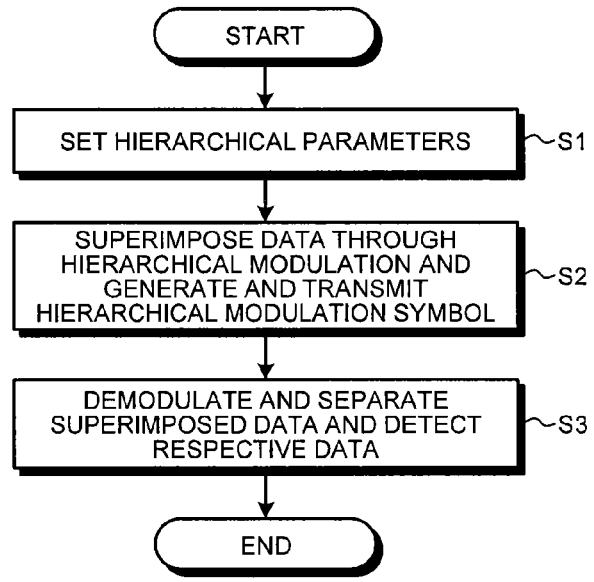
FIG. 15 is a flowchart illustrating transmission processing in the communication system.

Transmission processing in the communication system illustrated in FIG. 14 is described with reference to a flowchart. FIG. 15 is a flowchart illustrating the transmission processing in the communication system. First, the hierarchization-parameter setting unit 3 sets hierarchization parameters for the hierarchical modulation unit 11a of the transmission apparatus 1a and for the hierarchical demodulation unit 21a of the reception apparatus 2a (step S1). In the transmission apparatus 1a, the hierarchical modulation unit 11a superimposes data by using the hierarchical modulation on the basis of the hierarchization parameters and generates and transmits a hierarchical modulation symbol (step S2). In the reception apparatus 2a, the hierarchical demodulation unit 21a demodulates and separates the superimposed data from the received hierarchical modulation symbol by using the hierarchical demodulation and detects the respective data (step S3).

In the embodiment described, the communication system sets in advance hierarchization parameters determined to satisfy required line qualities respectively specified for the first layer line and the second layer line. It is anticipated that the required line quality is different depending on application target data and an application destination system. However, because line quality can be flexibly adjusted by the hierarchization parameters, it is applicable to various data or systems by setting parameters that satisfy the required line quality when being introduced into the system.

Note that, in the example described in the embodiment, the hierarchical modulation for superimposing different two layers is used. However, the hierarchical modulation is not limited to this and is also applicable when three or more layers are superimposed. Hierarchization parameters in that case can be set by the method described above.

In the example described in the embodiment, the transmission system is a one-to-one digital transmission system including one transmission apparatus 1a and one reception apparatus 2a. However, the transmission system is not limited to this and can include a plurality of transmission apparatuses 1a and a plurality of reception apparatuses 2a.

In the example described in the embodiment, one transmission line is provided between the transmission apparatus 1a and the reception apparatus 2a. However, the transmission system is not limited to this. A plurality of transmission lines can be provided between transmission and reception as in a MIMO (Multiple-Input Multiple-Output) system.

As described above, according to the embodiment, in the communication system, by using the hierarchization parameters including the three parameters of the hierarchization ratio, the mapping pattern, and the mapping pattern mixing ratio, the transmission apparatus transmits a signal obtained by hierarchically modulating and superimposing a plurality of data; and the reception apparatus hierarchically demodulates the received superimposed signal and detects the plurality of data. In this operation, it is possible to flexibly adjust line qualities according to the setting of the three respective parameters of the hierarchization parameters; and it is possible to satisfy predetermined transmission quality.

Second Embodiment

In this embodiment, a transmission apparatus determines hierarchization parameters. Differences from the first embodiment are described.

Figure 16:
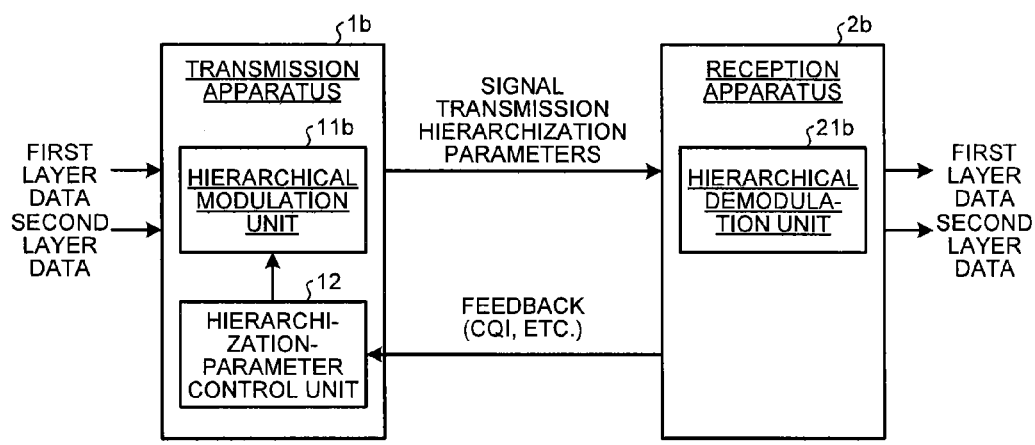
FIG. 16 is a diagram illustrating a configuration example of a communication system according to a second embodiment.

FIG. 16 is a diagram illustrating a configuration example of a communication system according to the embodiment. The communication system is configured from a transmission apparatus 1b and a reception apparatus 2b. The transmission apparatus 1b includes a hierarchical modulation unit 11b that receives a setting of hierarchization parameters and performs hierarchical modulation and a hierarchization-parameter control unit 12 that determines hierarchization parameters. The reception apparatus 2b includes a hierarchical demodulation unit 21b that receives the setting of the hierarchization parameters and performs hierarchical demodulation.

As in the first embodiment, as an example of the communication system, a system that performs one-to-one digital transmission from the transmission apparatus 1b to the reception apparatus 2b is illustrated. It is assumed that two kinds of transmission target data are transmitted by a first layer line and a second layer line subject to hierarchical modulation. In the embodiment, it is assumed that a feedback line from the reception apparatus 2b to the transmission apparatus 1b is separately provided. It is assumed that the reception apparatus 2b notifies the line quality information (e.g., channel quality information CQI (Channel Quality Indicator)) to the transmission apparatus 1b. As in the first embodiment, the application of various systems is conceivable as a communication system excluding the hierarchical modulation. However, a detailed communication system excluding the hierarchical modulation is not limited.

In the transmission apparatus 1b, the hierarchical modulation unit 11b superimposes the two kinds of data by using the hierarchical modulation and generates and transmits a hierarchical modulation symbol. In the embodiment, the hierarchization-parameter control unit 12 determines, on the basis of the line quality information fed back from the reception apparatus 2b, hierarchization parameters to satisfy predetermined transmission quality (line quality) and notifies the hierarchical modulation unit 11b of the hierarchization parameters. The transmission apparatus 1b transmits the hierarchization parameters to the reception apparatus 2b together with the hierarchical modulation symbol. Note that a method of notification to the reception apparatus 2b is not limited to this. Like the feedback from the reception apparatus 2b, the transmission apparatus 1b can notify the reception apparatus 2b of the hierarchization parameters using a line that is separate from a line for signal transmission.

In the reception apparatus 2b, the hierarchical demodulation unit 21b demodulates and separates the data superimposed in two layers from the received hierarchical modulation symbol by using the hierarchical demodulation and detects the two kinds of data. In the embodiment, the hierarchical demodulation unit 21b receives the setting of the hierarchization parameters from the transmission apparatus 1b in order to perform the hierarchical demodulation.

Note that an entity that determines the hierarchization parameters is different from the entity in the first embodiment. However, transmission processing in the communication system illustrated in FIG. 16 is the same as the flowchart illustrated in FIG. 15.

In the embodiment illustrated, the communication system adaptively determines hierarchization parameters in the hierarchization-parameter control unit 12 of the transmission apparatus 1b to satisfy required line qualities respectively specified for the first layer line and the second layer line, appropriately sets the hierarchization parameters, and transmits the hierarchization parameters to the hierarchical demodulation unit 21b of the reception apparatus 2b. When line quality of signal transmission fluctuates over time, it is possible to satisfy the required line quality by controlling the hierarchization parameters.

Note that, in the example described in the embodiment, the hierarchical modulation for superimposing two different layers is used. However, the hierarchical modulation is not limited to this and is also applicable when three or more layers are superimposed. Hierarchization parameters in that case can be set by the method described above.

In the example described in the embodiment, the transmission system is the one-to-one digital transmission system including one transmission apparatus 1b and one reception apparatus 2b. However, the transmission system is not limited to this and can include a plurality of transmission apparatuses 1b and a plurality of reception apparatuses 2b.

In the example described in the embodiment, one transmission line is provided between the transmission apparatus 1b and the reception apparatus 2b. However, the transmission system is not limited to this. A plurality of transmission lines can be provided between transmission and reception as in a MIMO (Multiple-Input Multiple-Output) system.

As described above, according to the embodiment, in the communication system, the transmission apparatus determines the hierarchization parameters. In this case, effects that are same as the effects in the first embodiment can be obtained.

Third Embodiment

In this embodiment, a reception apparatus determines hierarchization parameters. Differences from the first and second embodiments are described.

Figure 17:
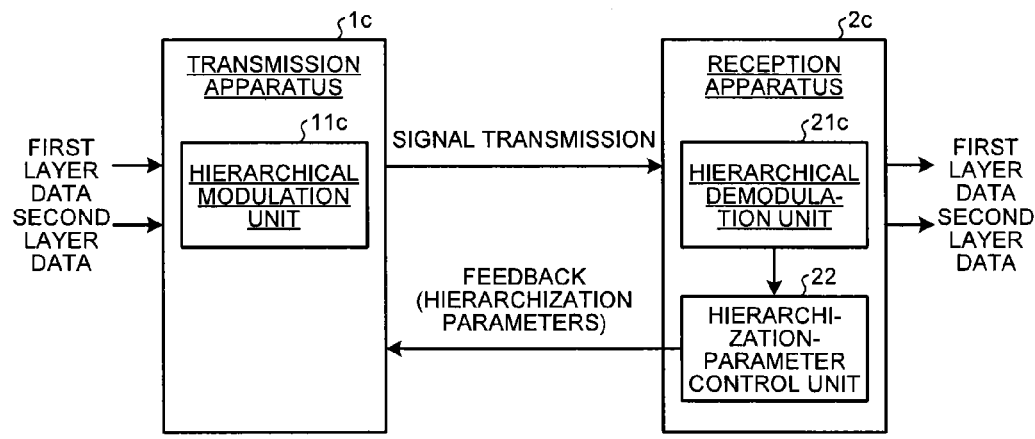
FIG. 17 is a diagram illustrating a configuration example of a communication system according to a third embodiment.

FIG. 17 is a diagram illustrating a configuration example of a communication system according to the embodiment. The communication system is configured from a transmission apparatus 1c and a reception apparatus 2c. The transmission apparatus 1c includes a hierarchical modulation unit 11c that receives settings of hierarchization parameters and performs hierarchical modulation. The reception apparatus 2c includes a hierarchical demodulation unit 21c that receives the settings of the hierarchization parameters and performs hierarchical demodulation and a hierarchization-parameter control unit 22 that determines the hierarchization parameters.

As in the first and second embodiments, as an example of the communication system, a system that performs one-to-one digital transmission from the transmission apparatus 1c to the reception apparatus 2c is described. It is assumed that two kinds of transmission data are transmitted by a first layer line and a second layer line of the hierarchical modulation. In the embodiment, it is assumed that a feedback line from the reception apparatus 2c to the transmission apparatus 1c is separately provided. It is assumed that the transmission apparatus 1c is notified of hierarchization parameters determined by the reception apparatus 2c. As in the first and second embodiments, application of various systems is conceivable as a communication system excluding the hierarchical modulation. However, a detailed communication system excluding the hierarchical modulation is not limited thereto.

In the transmission apparatus 1c, the hierarchical modulation unit 11c superimposes two kinds of data by using the hierarchical modulation and generates and transmits a hierarchical modulation symbol. In the embodiment, the hierarchical modulation unit 11c performs the hierarchical modulation according to the hierarchization parameters notified thereto by the reception apparatus 2c.

In the reception apparatus 2c, the hierarchical demodulation unit 21c demodulates and separates the data superimposed in two layers from the received hierarchical modulation symbol by using the hierarchical demodulation and detects the two kinds of data. In the embodiment, the hierarchization-parameter control unit 22 determines, on the basis of line quality information estimated thereby, hierarchization parameters to satisfy predetermined transmission quality (line quality) and notifies the transmission apparatus 1c of the hierarchization parameters by using the hierarchical demodulating unit 21c and the feedback line.

Note that an entity that determines the hierarchization parameters is different from the entity in the first embodiment. However, transmission processing in the communication system illustrated in FIG. 17 is the same as the flowchart illustrated in FIG. 15.

In the embodiment illustrated, the communication system adaptively determines hierarchization parameters in the hierarchization-parameter control unit 22 of the reception apparatus 2c so as to satisfy required line qualities specified for the first layer line and the second layer line, respectively; appropriately sets the hierarchization parameters; and transmits the hierarchization parameters to the hierarchical modulation unit 11c of the transmission apparatus 1c through the feedback line. When line quality of signal transmission fluctuates due to any time lapse, it is possible to satisfy the required line quality by controlling the hierarchization parameters.

Note that, in the example described in the embodiment, hierarchical modulation for superimposing different two layers is used. However, the hierarchical modulation is not limited to this and is also applicable when three or more layers are superimposed. Hierarchization parameters in that case can be set by the method described above.

In the example described in the embodiment, the transmission system includes the one-to-one digital transmission system including one transmission apparatus 1c and one reception apparatus 2c. However, the transmission system is not limited to this and can include a plurality of transmission apparatuses 1c and a plurality of reception apparatuses 2c.

In the example described in the embodiment, one transmission line is provided between the transmission apparatus 1c and the reception apparatus 2c. However, the transmission system is not limited to this. A plurality of transmission lines can be provided between the sides of transmission and reception as in a MIMO (Multiple-Input Multiple-Output) system.

As described above, according to the embodiment, in the communication system, the reception apparatus determines the hierarchization parameters. In this case, effects same as the effects in the first and second embodiments can be obtained.

Note that the embodiments are described above. However, it goes without saying that various modifications are possible for combinations of the constituent elements and the processing processes in the embodiments.

INDUSTRIAL APPLICABILITY

As described above, the communication system according to the present invention is useful for a system of digital communication and, in particular, suitable for a system that uses the hierarchical modulation.

REFERENCE SIGNS LIST 1a, 1b, 1c Transmission apparatuses,
2a, 2b, 2c Reception apparatuses,
3 Hierarchization-parameter setting unit,
11a, 11b, 11c Hierarchical modulation units,
12, 22 Hierarchization-parameter control unit,
21a, 21b, 21c Hierarchical demodulation units

The invention claimed is:
1. A communication system comprising:
a transmission apparatus that transmits a signal obtained by hierarchically modulating a plurality of signal sequences on the basis of hierarchization parameters while maintaining gray codes;
a reception apparatus that receives the hierarchically modulated signal, hierarchically demodulates the received signal on the basis of the hierarchization parameters, and detects the signal sequences; and
a hierarchization-parameter setting unit that sets and sends the hierarchization parameters to the transmission apparatus and the reception apparatus, the hierarchization parameters including a hierarchization ratio which is a signal power ratio for a higher layer and a lower layer in the hierarchical modulation, a mapping pattern indicating two patterns selected from pattern candidates for bit mapping while allowing redundancy, and a mapping pattern mixing ratio indicating a ratio for applying each of the two patterns in a multiplexing direction.

2. A communication system comprising:
a transmission apparatus that
sets, as hierarchization parameters of the transmission apparatus and a reception apparatus, a hierarchization ratio which is a signal power ratio for a higher layer and a lower layer in hierarchical modulation, a mapping pattern indicating two patterns selected from pattern candidates for bit mapping while allowing redundancy, and a mapping pattern mixing ratio indicating a ratio for applying each of the two patterns in a multiplexing direction, and
transmits a signal obtained by hierarchically modulating a plurality of signal sequences on the basis of the hierarchization parameters while maintaining gray codes; and
a reception apparatus that receives the hierarchically modulated signal, hierarchically demodulates the received signal on the basis of the hierarchization parameters, and detects the signal sequences.

3. The communication apparatus according to claim 2, wherein
the transmission apparatus sets, when the reception apparatus notifies the transmission apparatus of line quality information, the hierarchization parameters on the basis of the line quality information.

4. A communication system comprising:
a transmission apparatus that transmits a signal obtained by hierarchically modulating a plurality of signal sequences on the basis of hierarchization parameters while maintaining gray codes;
a reception apparatus that
sets, as the hierarchization parameters of the transmission apparatus and the reception apparatus, a hierarchization ratio which is a signal power ratio for a higher layer and a lower layer in the hierarchical modulation, a mapping pattern indicating two patterns selected from pattern candidates for bit mapping while allowing redundancy, and a mapping pattern mixing ratio indicating a ratio for applying each of the two patterns in a multiplexing direction,
hierarchically demodulates the received hierarchically modulated signal on the basis of the hierarchization parameters, and
detects the signal sequences.

5. The communication system according to claim 4, wherein
the reception apparatus sets the hierarchization parameters on the basis of line quality information estimated by the reception apparatus.

6. A digital transmission method comprising:
a hierarchical-parameter setting step for setting hierarchization parameters of a transmission apparatus and a reception apparatus;
a hierarchical modulation step in which the transmission apparatus transmits a signal obtained by hierarchically modulating a plurality of signal sequences on the basis of the hierarchical parameters while maintaining gray codes; and
a hierarchical demodulation step in which the reception apparatus receives the hierarchically modulated signal, hierarchically demodulates the received signal on the basis of the hierarchization parameters, and detects the signal sequences, wherein
at the hierarchization-parameter setting step, as the hierarchization parameters, a hierarchization ratio which is a signal power ratio for a higher layer and a lower layer in the hierarchical modulation, a mapping pattern indicating two patterns selected from pattern candidates for bit mapping while allowing redundancy, and a mapping pattern mixing ratio indicating a ratio for applying each of the two patterns in a multiplexing direction are set.

7. The digital transmission method according to claim 6, wherein
at the hierarchization-parameter setting step, the hierarchization parameters are set on the basis of line quality information estimated by the reception apparatus.

* * * * *